United States Patent [19]

Frutiger

[11] 4,071,693
[45] Jan. 31, 1978

[54] METHOD AND APPARATUS FOR SYNCHRONIZING A RECEIVER END-KEY GENERATOR WITH A TRANSMITTER END-KEY GENERATOR

[75] Inventor: Peter Frutiger, Wangen, Switzerland

[73] Assignee: Anstalt Europaische Handelsgesellschaft, Vaduz, Liechtenstein

[21] Appl. No.: 652,757

[22] Filed: Jan. 27, 1976

[30] Foreign Application Priority Data

Feb. 5, 1975 Switzerland .................... 1365/75

[51] Int. Cl.² .............................................. H04L 7/00
[52] U.S. Cl. ............................ 178/69.1; 340/146.1 D
[58] Field of Search ................ 178/69.5 R, 22, 69.1; 340/146.1 D; 179/1.5 R

[56] References Cited

U.S. PATENT DOCUMENTS

| | | | |
|---|---|---|---|
| 3,555,425 | 1/1971 | Dumaire | 178/69.5 R |
| 3,562,710 | 2/1971 | Halleck | 340/146.1 D |
| 3,725,579 | 4/1973 | Sturzinger | 178/22 |
| 3,800,086 | 3/1974 | Lyons | 178/69.5 R |
| 3,808,367 | 4/1974 | Wigner | 178/69.5 R |
| 3,920,894 | 11/1975 | Shirley | 178/22 |

Primary Examiner—Robert L. Griffin
Assistant Examiner—Michael A. Masinick
Attorney, Agent, or Firm—Ostrolenk, Faber, Gerb & Soffen

[57] ABSTRACT

A method of, and apparatus for, synchronizing a receiver end-Key Generator with a transmitter end-Key Generator wherein both Key Generators are coupled with a respective counter such that each counter state of each counter characterizes a place or position of the Key pulse chain produced by the associated Key Generator. Each counter state is formed in accordance with a formation principle from the preceding counter state. The counter state of the counter of the transmitter end-Key Generator is transmitted to the receiver end and there compared with the counter state of the counter of the receiver end-Key Generator and whenever there is a difference between both counter states the receiver end-Key Generator stepped forward until the difference is again zero. The receiver end-Key Generator is stepped forward when the determined difference of the counter states is smaller than a threshold value and such Key Generator is stepped forward in jumps which encompass many individual advancing steps whenever the difference of the counter states exceeds the aforesaid threshold value.

5 Claims, 14 Drawing Figures

| PL. | I II III IV |
|---|---|
| POS. 1 | L O O L |
| POS. 2 | L L O O |
| POS. 3 | O L L O |
| POS. 4 | L O L L |
| POS. 5 | O L O L |
| POS. 6 | L O L O |
| POS. 7 | L L O L |
| POS. 8 | L L L O |
| POS. 9 | L L L L |
| POS. 10 | O L L L |
| POS. 11 | O O L L |
| POS. 12 | O O O L |
| POS. 13 | L O O O |
| POS. 14 | O L O O |
| POS. 15 | O O L O |
| POS. (16) | L O O L |

Fig. 4

|   | I II III IV |     |    |
|---|---|-----|----|
| A | L O L L | (4) |    |
| B | L L O L | (7) | a) |
| C | L O L O | (6) |    |
|   |         |     |    |
|   | ☐       |     |    |
| $B_1$ | O L O L | (5) |    |
| $C_1$ | L O L O | (6) | b) |
|   |         |     |    |
| $B_2$ | O L O L | (5) |    |
| $C_2$ | L O L O | (6) | c) |
| $D_2$ | L L O L | (7) |    |
|   |         |     |    |
| $B_3$ | O L O L | (5) |    |
| $C_3$ | L O L O | (6) | d) |
| $D_3$ | L L O L | (7) |    |
|   |         |     |    |
| $D_4$ | L L O L | (7) |    |
| E | L L L L | (9) | e) |
| F | L L L L | (9) |    |
|   |         |     |    |
|   | L L O L | (7) |    |
| $E_1$ | L L L O | (8) | f) |
| $F_1$ | L L L L | (9) |    |

METHOD AND APPARATUS FOR SYNCHRONIZING A RECEIVER END-KEY GENERATOR WITH A TRANSMITTER END-KEY GENERATOR

BACKGROUND OF THE INVENTION

The present invention relates to a new and improved method for synchronizing a receiver end-Key Generator with a transmitter end-Key Generator and further pertains to apparatus for the performance of the aforesaid method.

There are known to the art enciphering devices and deciphering devices equipped with Key Generators (key character generators) which produce a train of Key pulses. These Key pulses are coupled in conventional manner with the pulses of the text or message which is to be enciphered to deciphered, respectively. As a generaly rule the Key Generators are stepped forward by one step for each bit which is to be enciphered or deciphered, respectively, so that there is insured for the required synchronization between the Key Generator located at the receiver (receiver end) and the Key Generator located at the transmitter (transmitter end). For the enciphering or deciphering respectively, of a new bit there is thus always utilized a new Key bit of the Key pulse train.

At the present time the following three requirements, among others, are placed upon the Key Generators:

1. High operating speed.
2. Complicated formation principle for producing the Key pulse train.
3. Extremely long period of the Key pulse train sequence.

The first demand or requirement listed above is placed by virtue of the transmission technology presently in existence, whereas the second and third requirements exist for security reasons since decrypting of an enciphered text or message by unauthorized individuals must be rendered impossible even when using the most modern devices or aids.

For proper deciphering it is necessary that at the start of transmission of a message of the Key Generators at both the transmitter end and the receiver end have the same starting position. In other words the Key pulse train of the receiver end-Key Generator should be at the same location as the Key pulse train at the transmitter end-Key Generator.

This synchronization of the Key Generators at the transmitter end and the receiver end at the start of message transmission is particularly problematic in the case of meshed or interconnected networks where there are transmitted in different directions always between different stations messages of high information content. If for instance station A has transmitted a message to station B during a predetermined time duration T, e.g. 20 seconds, with a clock frequency of 5 MHz, then as above explained, the Key Generators of these stations A and B have been stepped forward by a number of steps corresponding to the length of the transmitted message and have assumed a different position of the Key pulse sequence. Now if station A or station B should transmit a message to station C which was not in operation during the aforementioned time duration T, then it should be apparent that first of all the Key Generator of such station C must be brought into synchronism with the Key Generator of the station A or station B, as the case may be. In other words for the aforementioned numerical example the Key Generator of the station C must be stepped forward $20.5 \cdot 10^6$ steps. This adjustment of the Key Generator should however occur for practical reasons without time-delay. If the adjustment should take place for instance within 0.1 seconds, then this means that the Key Generator must be stepped with a clock frequency of 1 GHz. Yet, in practice this is not possible for physical reasons. It is for this reason that up to the present there have not been devised any enciphering- and deciphering devices which can be employed in the above explained manner for relatively high transmission speeds.

SUMMARY OF THE INVENTION

Hence it is a primary object of the present invention to overcome the aforementioned shortcomings of the prior art proposals.

Another and more specific object of this invention aims at the provision of a novel method of, and apparatus for, rapidly synchronizing the Key Generators at the transmitter end and receiver end of a system for enciphering and deciphering messages.

Now in order to implement these and still further objects of the invention, which will become more readily apparent as the description proceeds, the invention contemplates that the Key Generator at the transmitter end and the Key Generator at the receiver end are each coupled with a respective counter such that each counter state of the counter is characteristic of a position or place of the Key pulse sequence produced by the associated Key Generator. Each counter state is formed according to a given formation principle from the preceding counter state. The counter state of the counter of the transmitter end-Key Generator is transmitted to the receiver end where it is compared with the counter state of the counter of the receiver end-Key Generator. If there is determined a difference between both counter states then the receiver end-Key Generator is stepped forward for such time until the difference between the counter states is again zero. The receiver end-Key Generator is stepwise advanced if the determined difference between the counter states is smaller that a threshold or boundary value and this Key Generator is advanced always in jumps encompassing a larger number of individual advancing steps when the difference between the counter states exceeds the aforementioned threshold value.

The invention is not only concerned with the aforementioned method aspects but also contemplates apparatus for the performance thereof. Such apparatus is manifested by the features that both the Key Generator at the transmitter end and also the Key Generator at the receiver end are each coupled with a counter in such a manner that each counter states is characteristic of a position or place of the Key pulse sequence produced by the the associated Key Generator. Further, at the receiver end there is provided a comparison circuit or comparator which compares the counter states received from the transmitter end-counter with the counter state of the receiver end-counter and as a function of the determined difference between the compared counter states steps forward the receiver end-Key Generator for such length of time until such difference again equals zero.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4 illustrates the course of the control of the received counter state which is carried out at the receiver end.

DETAILED DESCRIPTION OF THE INVENTION

Describing now the drawings it is to be understood that there have been illustrated therein only the components of the transmitter station and receiver station as needed for one skilled in the art to readily understand and appreciate the underlying concepts of the present invention. The clock generators for the transmitter station and the receiver station operate synchronously with the aid of a conventional and therefore not particularly illustrated clock synchronization device, so that it should be understood that the reference clock speed at the transmitter device and receiver device can be assumed to be the same.

Figure 1:
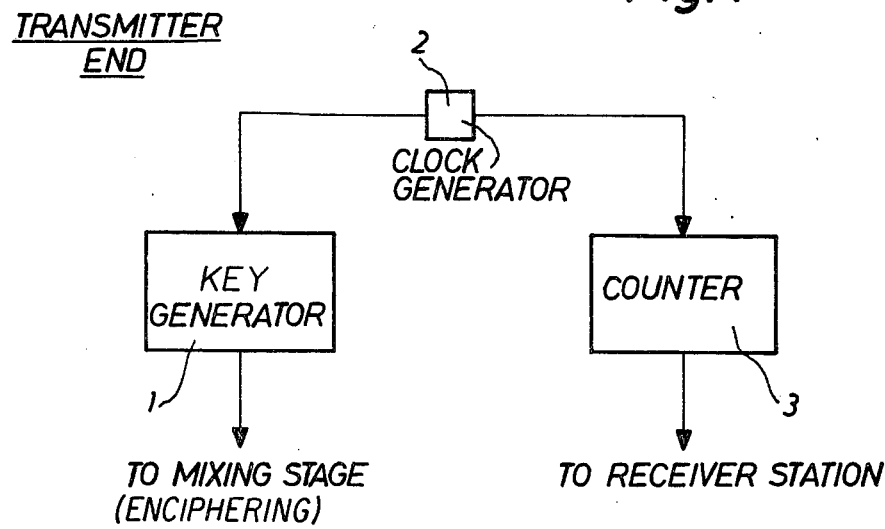
FIG. 1 is a block circuit diagram of the transmitter end-circuit arrangement.

Continuing, the circuitry shown in FIG. 1, which constitutes part of the transmitter station, comprises a Key Generator 1 of conventional construction which is operatively connected with a clock generator 2. This clock generator 2 is furthermore coupled with a counter 3, the function and mode of operation of which will be explained more fully hereinafter.

The Key Generator 1 is connected with a not further illustrated mixing stage where in conventional manner there occurs the bit by bit enciphering of the message to be enciphered with the bits the Key sequence produced by the Key Generator 1. The counter state of the counter 3 together with the enciphered message is transmitted to the receiver end or receiver.

The transmission of the counter states may occur, for instance, in the manner disclosed in the commonly assigned, copending United States application, Ser. No. 652,758, filed Jan. 27, 1976, entitled "Method And Apparatus For The Synchronization Of A Deciphering Device Functioning As Receiver With An Enciphering Device Functioning As Transmitter", the disclosure of which is incorporated herein by reference. The counter state is advantageously transmitted in the same form as the actual message, that is to say, preferably in a binary form or notation.

The counter 3 is coupled with the Key Generator 2 in such a manner that each counter state corresponds to an unambiguous predetermined position or place of the Key pulse sequence produced by the Key Generator 1.

Each counter state of the counter 3 is formed according to a predetermined formation principle or law from the preceding counter state. Basically there can be used every principle but it is advantageous to portray each counter state by a sequence of bits without any place value.

If for instance the counter state is represented by numbers in the decimal system, then each place of the number has a greater or smaller weight. This has the disadvantage that with faulty transmission, depending upon the value of the falsely transmitted place, there occurs a greater or lesser transmission error.

In order to avoid as far as possible such type transmission errors the counter state, as mentioned, is formed by a bit sequence without any place value. An example of a counter working according to this principle is illustrated in FIG. 3.

Figure 3:
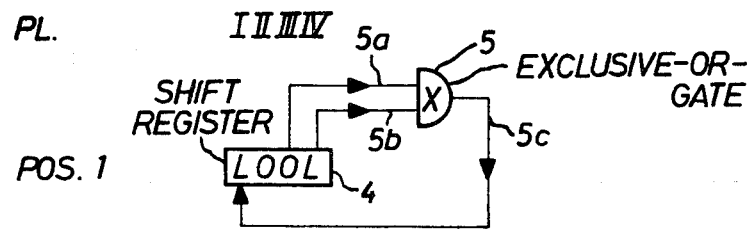
FIG. 3 illustrates the construction and mode of operation of a counter of the circuitry of FIGS. 1 and 2.

In such FIG. 3 there is illustrated a four stage reinjected shift register 4 the feedback of which is coupled via an Exclusive-Or-feedback logic circuit or device 5. The inputs 5a and 5b of the feedback logic circuit 5 are respectively connected with the third stage and fourth stage of the shift register 4, the first stage of which is coupled with the output 5c of such feedback logic circuit 5. The information which is inserted into the first shift register stage I during each clock pulse is formed from the information previously stored in the third stage III and fourth stage IV according to the following truth table:

$$L \times O = L$$

$$O \times L = L$$

$$L \times L = O$$

$$O \times O = O$$

In FIG. 3 there are illustrated the successive states of the shift register 4, there being started with the random state illustrated at position 1. In position 16 there has again been attained the state according to position 1. After 15 steps there has occurred once each of the possible states apart from the state "O", "O", "O", which according to the truth table does not produce any new state.

In the event there is necessary a larger period length, then there must be used correspondingly longer shift registers. In order to actually attain the maximum period length $N = 2^n - 1$ ($n$ = number of stages of the shift register), it is necessary that the feed back logic circuit be connected to quite predetermined stages of the shift register.

Figure 2:
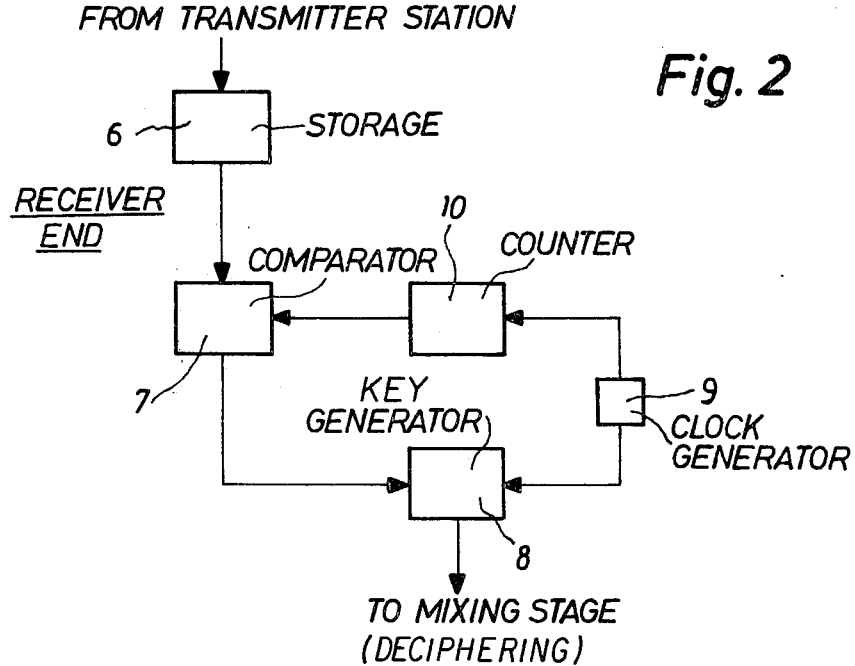
FIG. 2 is a block circuit diagram of the receiver end-circuit arrangement.

In FIG. 2 there is illustrated a circuit forming part of the receiver station. This circuit comprises a storage memory 6 which is connected with a comparison circuit or comparator 7. This comparison circuit 7 is coupled with a Key Generator 8 constructed analagous to the Key Generator 1 of FIG. 1 and like the latter produces the same Key sequence and transmits the Key pulses to a not particularly illustrated mixing stage or mixer where in conventional manner there takes place bit by bit the deciphering of the received information.

Furthermore there is provided a clock generator 9 which is coupled both with the Key Generator 8 and a counter 10. As already explained above the clock generator 9 operates in synchronism with the clock generator 2 of the transmitter station (FIG. 1) with the aid of a conventional clock synchronization device.

The counter 10, like the counter 3 of FIG. 1, is coupled with the Key Generator 8 in such a manner that each counter state corresponds to an unambiguous predetermined position of the Key sequence of the Key Generator 8. The counter 10 corresponds in its construction and mode of operation to the counter 3 of FIG. 1 and therefore is likewise advantageously constructed as a feedback shift register of the type as shown and discussed above with reference to FIG. 3.

If both of the counters 3 and 10 of FIGS. 1 and 2 possess the same counter state, then the Key sequence of both Key Generators 1 and 8 must be at the same position. The counter state of the counter 10 is delivered to the comparison circuit 7.

The counter states of the counter 3 of the transmitter station and received from the receiver station are stored in storage 6. If these counter states are transmitted together with the actual message, then at the receiver end there first occurs a separation of the counter states and the message, as such has been described for instance in the aforementioned copending United States application.

The comparison circuit 7 in the first instance serves to compare the received counter states stored in the storage 6 with the counter state obtained from the counter 10. The received counter states can be considered as reference value data and the counter state of the counter 10 as actual value data.

Now if the comparison circuit 7 determines a difference between the counter state (reference value) stored in the storage 6 and the counter state (actual value) received from the counter 10 then the comparison circuit 7 delivers forward stepping or indexing commands to the Key Generator 8 and the counter 10 coupled therewith for such length of time until the received counter state of the transmitter end-counter 3 coincides with the counter state of the receiver end-counter 10. From this moment on both of the Key Generators at the transmitter end and receiver end are in step or synchronism which is a prerequisite for the correct deciphering of the received message.

As mentioned at the outset of this disclosure the adjustment of the receiver end-Key Generator should take place very rapidly. If the difference between the counter states as determined by the comparison circuit 7 exceeds a predetermined threshold or boundary value, then the comparison circuit 7 brings about a jump-like advance of the Key Generator 8. However, if the determined difference does not reach this predetermined threshold value then the advance occurs in a step-like manner.

By virtue of the fact that with large differences between the counter states the forward advance occurs in a jump-like manner and not in a step-like manner, the time expended for bringing into step or synchronizing the Key Generators is less than that during stepwise forward advance since with each forward jump there are passed over many individual forward advance steps.

The comparison circuit 7 however still has the further function of controlling for transmission errors the arriving counter states stored in the storage 6. For this purpose the arriving counter states are stored over two or three position messages in the storage 6 and there is employed for control purposes the principle for the formation of the counter states.

In FIG. 4a there are illustrated three counter states of the transmitter end-counter 3 which have been stored in succession in the storage 6. The counter state indicated by reference character A corresponds to position 4 of FIG. 3 and such has been indicated in parenthesis. The counter state at location B should correspond to position 5, but due to a transmission eror at the first position or place there has been stored a "L" instead of a "O", so that the received counter state corresponds to position 7. At location C there is again illustrated the properly received next successive counter state corresponding to position 6 (FIG. 3).

At the receiver end it is not possible without further measures to determine which counter state is correct and which is false. It can be assumed that such errors do not occur very frequently and that therefore the majority of the transmitted information signals have been correctly received.

The comparison circuit 7 embodies a switching circuit which, while employing the known formation principle and based upon the received counter state illustrated at location A of FIG. 4a, produces both of the next successive counter states which are to be expected. In FIG. 4b there are illustrated both of the next expected counter states $B_1$ and $C_1$ as such are formed by the switching circuit of the comparison circuit 7. The counter state $B_1$ formed at the receiver end on the basis of the received counter state A (FIG. 4a) coincide at the positions or places II, III and IV with the received counter state B (FIG. 4a). The aforementioned switching circuit of the comparison circuit 7 determines the identity at these places and adjusts to the counter state position 5 since the falsely occupied place I is in the minority. Upon the arrival of the next counter state the switching circuit of the comparison circuit 7 determines that the counter state $C_1$ formed by it coincides at all four places with the counter state C of FIG. 4a. The switching circuit of the comparison circuit 7 thus adjusts itself to the counter state according to position 6.

In FIG. 4c there are illustrated the received counter states $B_2$, $C_2$ and $D_2$ and in FIG. 4d the receiver end-formed counter states $B_3$, $C_3$, $D_3$. The received and the receiver end-formed counter states coincide at all four places or positions.

In FIG. 4e there are illustrated the further received counter states $D_4$, E and F and in FIG. 4f the corresponding receiver end-formed counter states $E_1$, $F_1$. The received counter state E is false at position or place IV. As to next following counter state $E_1$ formed by the switching circuit of the comparison circuit 7 owing to the received counter state $D_4$ there will be seen by a comparison with the counter state E that there prevails at the place I, II and III coincidence between the counter states E and $E_1$. The receiver thus adjusts to the counter state according to position 8. The received and the receiver end-formed counter states F and $F_1$ again coincide at all four places, serving to substantiate the majority decision reached during comparison of the counter states E and $E_1$.

It is apparent that the described nature of the formation of the counter states and the control at the receiver end provides great guarantee for proper synchronization or placing in step of the Key Generators. Only very marked disturbances, which affect a number of counter state messages in succession or a large number of place data of a counter state, periodically throw the receiver station out of step. Once the transmitter station and the receiver station operated synchronously then with a suitable circuit it is possible to prevent loss of the synchronism already with the first false transmitted counter state which no longer can be reconstructed by majority decision at the receiver end. By means of this circuit there is brought about that only after a number of markedly disturbed counter state messages there will be again determined the correct counter state.

It should be apparent that when using counters, the counter state of which is represented by numbers with place values the above described rapid correction of falsely transmitted counter states is not possible.

While there is shown and described present preferred embodiments of the invention, it is to be distinctly understood that the invention is not limited thereto, but may be otherwise variously embodied and practiced within the scope of the following claims. Accordingly,

What is claimed is:

1. A method of synchronizing a receiver end-Key Generator with a transmitter end-Key Generator, comprising the steps of:
   a. coupling each of the Key Generators with an associated counter such that the counter state of each counter is characteristic of a position of a Key sequence produced by the associated Key Generator;
   b. forming each counter state from the preceding counter state in accordance with a predetermined formation principle;
   c. transmitting the counter state of the counter of the transmitter end-Key Generator to the receiver end;
   d. comparing the thus transmitted counter state with the counter state of the counter of the receiver end-Key Generator;
   e. upon determination of a difference between both counter states, forwardly advancing the receiver end-Key Generator until the difference between the counter states is reduced to null;
   f. said forwardly advancing step (e) comprising:
      i. forwardly advancing in steps the receiver end-Key Generator when the determined difference between the counter states is smaller than a threshold value; and
      ii. forwardly advancing the receiver end-Key Generator in jumps encompassing a multiplicity of individual advancing steps when the difference between the counter states exceeds said threshold value;
   g. and producing at the receiver end by means of the formation principle for forming the counter states the next successive counter states which are to be expected owing to the received counter states of the transmitter end-counter, comparing such counter states produced at the receiver end with the correspondingly received counter states, and upon determining a difference of the receiver end produced counter state and the correspondingly received counter state determining the correct counter state based upon the majority of the coinciding places of the counter states.

2. The method as defined in claim 1, including the step of forming the counter states of the counters by a sequence of characters which do not possess any place value.

3. An apparatus for the synchronization of a receiver end-Key Generator with a transmitter end-Key Generator comprising:
   a. a Key Generator provided at the receiver end;
   b. A Key Generator provided at the transmitter end;
   c. a counter provided for the receiver end;
   d. a counter provided for the transmitter end;
   e. means for connecting the counter at the receiver end with the Key Generator thereof and means for connecting the counter at the transmitter end with the Key Generator thereof such that each counter state of the counters is characteristic of a position of a Key sequence produced by the associated Key Generator; and
   f. a comparison circuit provided for the receiver end for comparing the counter states received from the transmitter end-counter with the counter states of the receiver end counter and for forwardly advancing the Key Generator at the receiver end as a function of the determined difference between the compared counter states until such difference assumes the value zero;
   g. a storage provided at the receiver end for the storage of the received counter states;
   h. said comparison circuit possessing a switching circuit for the control of the received counter states which have been stored in the storage, said switching circuit producing the next following counter states to be expected as a function of the received counter states and comparing such with the correspondingly received counter states and in the presence of a difference between the compared counter states determining the correct counter state as a function of the majority of the coinciding places of the compared counter states.

4. The apparatus as defined in claim 3, wherein both of said counters are of the same construction and each comprise a reinjected shift register means.

5. The apparatus as defined in claim 4, including feedback means for each reinjected shift register means, said feedback means embodying an Exclusive-Or-circuit.

* * * * *